(12) United States Patent
Hirose

(10) Patent No.: US 8,274,598 B2
(45) Date of Patent: Sep. 25, 2012

(54) IMAGE CAPTURING APPARATUS AND CONTROL METHOD THEREFOR

(75) Inventor: Minoru Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 12/738,821

(22) PCT Filed: Oct. 17, 2008

(86) PCT No.: PCT/JP2008/069281
§ 371 (c)(1),
(2), (4) Date: Apr. 19, 2010

(87) PCT Pub. No.: WO2009/057510
PCT Pub. Date: May 7, 2009

(65) Prior Publication Data
US 2010/0214440 A1  Aug. 26, 2010

(30) Foreign Application Priority Data

Oct. 31, 2007  (JP) ................................. 2007-283793

(51) Int. Cl.
*H04N 5/222* (2006.01)

(52) U.S. Cl. .................................. 348/362; 348/333.01
(58) Field of Classification Search .................. 348/362, 348/364, 333.01, 333.02, 333.12
See application file for complete search history.

(56) References Cited

U.S. PATENT DOCUMENTS

| 6,943,839 | B1 | 9/2005 | Matsumoto | |
|---|---|---|---|---|
| 2001/0003466 | A1 | 6/2001 | Kubo | |
| 2005/0270412 | A1* | 12/2005 | Kamon et al. | 348/362 |
| 2007/0165133 | A1 | 7/2007 | Shmizu et al. | |
| 2011/0122310 | A1* | 5/2011 | Kudo | 348/349 |

FOREIGN PATENT DOCUMENTS

| CN | 101001325 A | 7/2007 |
|---|---|---|
| JP | 08-214199 A | 8/1996 |
| JP | 10-319306 A | 12/1998 |
| JP | 2001-069401 A | 3/2001 |

(Continued)

OTHER PUBLICATIONS

JEIDA-49-1998, "Image File Format Specification for Digital Still Cameras (Exif) Version 2.1", "Appendix C: about APEX".

(Continued)

*Primary Examiner* — Tuan Ho
(74) *Attorney, Agent, or Firm* — Carter, DeLuca, Farrell & Schmidt LLP

(57) ABSTRACT

In an image capturing apparatus that is capable of selecting a display mode for live view display from multiple display modes, the difference between a measured subject brightness and an image brightness obtained from an exposure condition for acquiring live view images is obtained. Then, exposure conditions for acquiring the live view images are changed depending on a threshold corresponding to the selected display mode and on the value of the obtained difference. The image capturing apparatus allows for control of the exposure conditions for acquiring the live view images in accordance with the selected live view display mode.

9 Claims, 4 Drawing Sheets

FOREIGN PATENT DOCUMENTS

| | | | |
|---|---|---|---|
| JP | 2003-244620 | A | 8/2003 |
| JP | 2004-193980 | A | 7/2004 |
| JP | 2005-124039 | A | 5/2005 |
| JP | 2005-184657 | A | 7/2005 |
| JP | 2006-025012 | A | 1/2006 |
| JP | 2006-301080 | A | 11/2006 |
| JP | 2007-127978 | A | 5/2007 |
| JP | 2007-189481 | A | 7/2007 |

OTHER PUBLICATIONS

Japanese Office Action for Appln. No. 2007-283793 dated Mar. 5, 2012.

Chinese Office Action for Appln. No. 200880114390.8 dated Sep. 21, 2011.

Japanese Office Action for Appln. No. 2007-283793 dated Oct. 3, 2011.

* cited by examiner

FIG. 4
| DISPLAY MODE | EXPOSURE HOLD VALUE | |
|---|---|---|
| | 1/8 STEP INDEX VALUE | NUMBER OF STEPS |
| CORRECT DISPLAY MODE | 4 | 0.5 STEPS |
| EXPOSURE SIMULATION MODE | 1 | 0.125 STEPS |
FIG. 5A
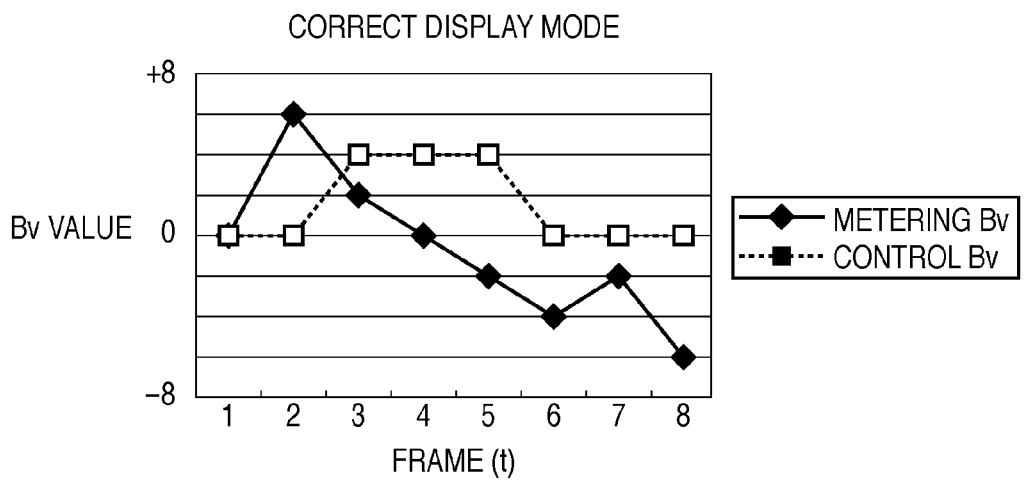
FIG. 5B
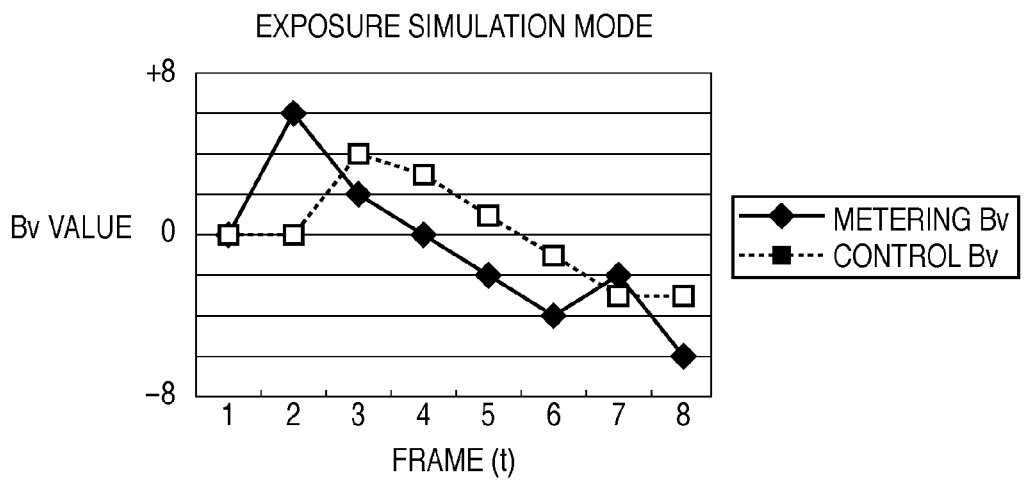

US 8,274,598 B2

IMAGE CAPTURING APPARATUS AND CONTROL METHOD THEREFOR

TECHNICAL FIELD

The present invention relates to an image capturing apparatus using an image sensor, and more particularly, to an image capturing apparatus which has a live view function and to a control method therefor.

BACKGROUND ART

Currently, many image capturing apparatuses using image sensors have a live view function in which, while continuously exposing the image sensor, live view images generated based on sequentially read image signals are sequentially displayed on a display device placed on the back side or the like of the apparatus. The live view function may be referred to as an electronic viewfinder (EVF) function, a through display function, or the like (see Japanese Patent Laid-Open No. 10-319306).

Further, the image capturing apparatus carries out metering in parallel with the live view display, uses a well-known automatic exposure control function to determine the exposure (a combination of the aperture value and the shutter speed) for shooting and control the exposure for acquiring images to be used for the live view display.

Images for the live view display are images acquired by carrying out sequential shooting. Thus, live view images, and in particular the brightness (luminance) thereof, will vary depending on how the shooting conditions, specifically, the exposure conditions, are set.

However, conventionally, sufficient consideration has not been given to how the exposure conditions for images to be used for live view display are best controlled in accordance with the display mode for the live view display, and live view display in accordance with the purpose of the user has not necessarily been carried out.

DISCLOSURE OF INVENTION

The present invention has been made in consideration of the problems of prior art, and has as its object to provide an image capturing apparatus that controls the exposure conditions for acquiring live view images depending on a selected live view display control mode, and a control method therefor.

According to one aspect of the present invention, an image capturing apparatus that is capable of live view display in which, while continuously exposing an image sensor, image signals are sequentially read out, and live view images generated based on the read image signals are sequentially displayed on a display device, and capable of selecting a display mode for the live view display from multiple display modes, the image capturing apparatus comprises:

metering unit for periodically measuring a subject brightness during the live view display;

acquisition unit for obtaining a difference between an image brightness obtained from exposure conditions for acquiring the live view images and the subject brightness obtained by the metering unit; and changing unit that changes the exposure conditions for acquiring the live view images depending on a threshold corresponding to the selected display mode and on the value of the difference.

According to another aspect of the present invention, a control method for an image capturing apparatus that is capable of live view display in which, while continuously exposing an image sensor, image signals are sequentially read out, and live view images generated based on the read image signals are sequentially displayed on a display device, and capable of selecting a display mode for the live view display from multiple display modes, the control method comprises:

a metering step of periodically measuring a subject brightness during the live view display;

an acquiring step of obtaining a difference between an image brightness obtained from exposure conditions for acquiring the live view images and the subject brightness obtained from the measuring step; and a changing step of changing the exposure conditions for acquiring the live view images depending on a threshold corresponding to the selected display mode and on the value of the difference.

According to still another aspect of the present invention, an image capturing apparatus that is capable of, while continuously exposing an image sensor, sequentially reading out image signals and sequentially displaying display images generated based on the read image signals on a display device, and capable of selecting a shooting mode from multiple shooting modes, the image capturing apparatus comprises:

a metering unit for measuring a subject brightness when displaying the display images on the display device;

an acquiring unit for obtaining a difference between an image brightness obtained from exposure conditions for acquiring the display images and the subject brightness obtained by the measuring unit; and a changing unit for changing the exposure conditions for acquiring the display images, depending on the width of a dead band corresponding to the selected shooting mode and on the value of the difference.

According to yet another aspect of the present invention, a control method for an image capturing apparatus that is capable of, while continuously exposing an image sensor, sequentially reading out image signals and sequentially displaying display images generated based on the read image signals on a display device, and capable of selecting a shooting mode from multiple shooting modes, the image capturing apparatus comprises:

a metering step of measuring a subject brightness during display of the display images on the display device;

an acquiring step of obtaining a difference between an image brightness obtained from exposure conditions for acquiring the display images and the subject brightness obtained in the measuring step; and a changing step of changing the exposure condition for acquiring the display images depending on the width of a dead band corresponding to the selected shooting mode and on the value of the difference.

Further features of the present invention will become apparent from the following description of exemplary embodiments with reference to the attached drawings.

BRIEF DESCRIPTION OF DRAWINGS

FIG. 4 is a diagram showing examples of an exposure hold value to be used in live view display control processing by the digital camera 100 according to the embodiment of the present invention; and FIGS. 5A and 5B are diagrams for explaining results for each display mode, which are obtained by live view display control processing in the digital camera 100 according to the embodiment of the present invention.

BEST MODE FOR CARRYING OUT THE INVENTION

Preferred embodiments of the present invention will now be described in detail in accordance with the accompanying drawings.

Figure 1:
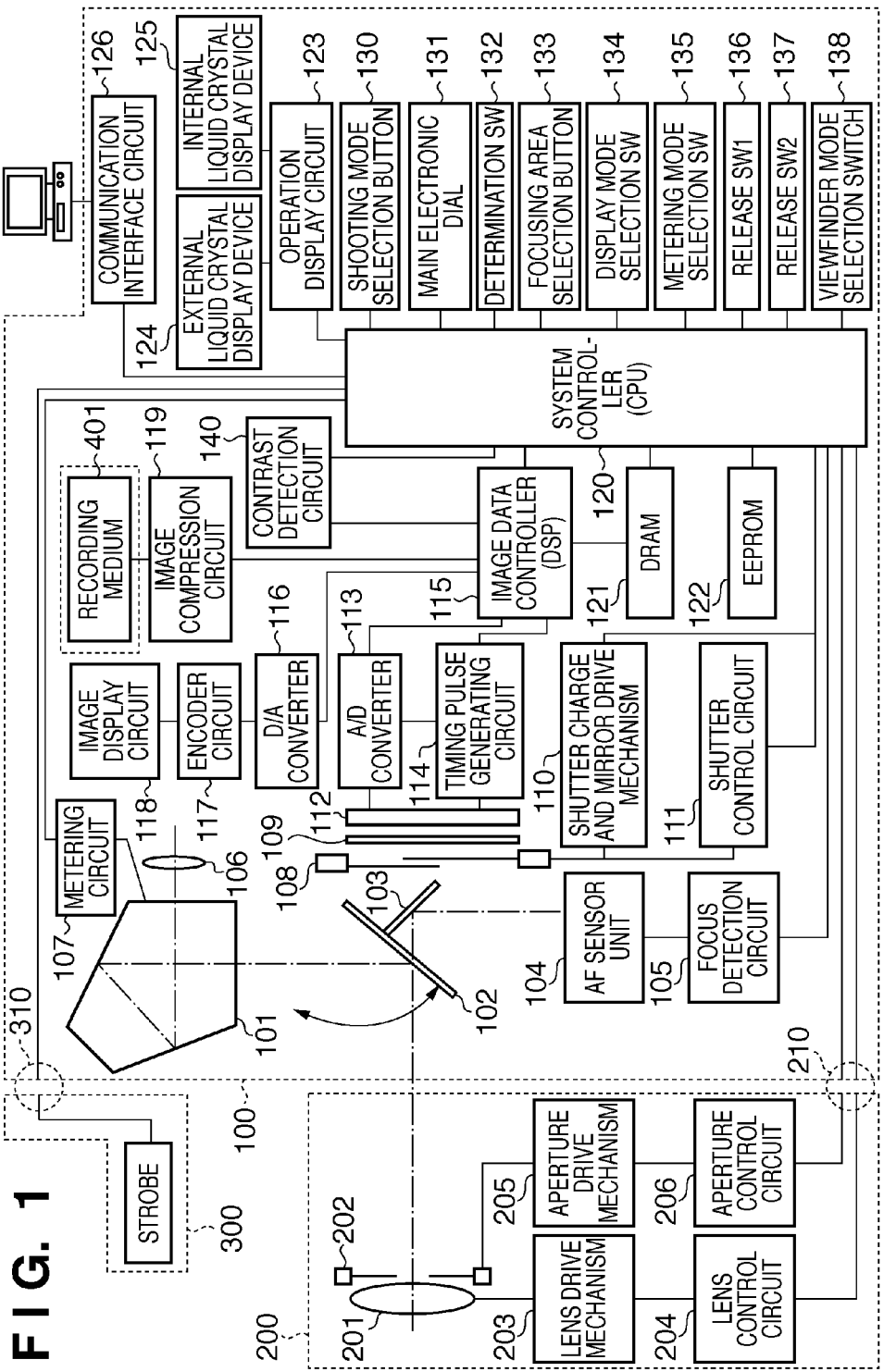
FIG. 1 is a block diagram illustrating an example of the mechanical and functional configuration of a digital camera as an example of an image capturing apparatus according to an embodiment of the present invention.

FIG. 1 is a block diagram illustrating an example of the mechanical and functional configuration of a digital camera as an example of an image capturing apparatus according to an embodiment of the present invention.

As shown in FIG. 1, a lens unit 200 is detachably mounted, via a lens mount, not shown, on a digital camera 100 according to the present embodiment. The lens mount is provided with contacts 210 for communicating between the digital camera 100 and the lens unit 200 and supplying power. Furthermore, the lens mount also has the function of transmitting signals to a system controller 120 when the lens unit 200 is mounted.

Through the contacts 210 of the lens mount, a photographing lens 201 and an aperture 202 in the lens unit 200 can be driven by supplying power from the digital camera 100 to the lens unit 200 and performing communication. It is to be noted that any form of signal may be used for communication performed through the contacts 210, and any form of signal such as not only electrical signals but also optical signals is available. Therefore, the contacts 210 can employ a configuration in accordance with the form of the signals used.

It is to be noted that although FIG. 1 shows only one photographing lens 201 included in the lens unit 200 for the sake of convenience, a plurality of lenses is actually included.

Subject light entering the photographing lens 201 is guided through the aperture 202 to a quick return mirror 102 with a range of movement indicated by an arrow in the figure. The central portion of the quick return mirror 102 serves as a half mirror, and a portion of light flux entering the center portion passes through when the quick return mirror 102 is located in the position shown in the figure (a down position). Then, the light flux passing through is reflected by a sub-mirror 103 placed on the back side of the quick return mirror 102 toward an AF sensor unit 104.

The AF sensor unit 104 is, for example, a phase-difference AF sensor unit which has a common configuration. The AF sensor unit 104 is composed of a field lens disposed near the imaging plane, a reflecting mirror, a secondary imaging lens, an aperture, a line sensor composed of a plurality of CCDs, etc.

A focus detection circuit 105 controls the AF sensor unit 104 in accordance with control signals from the system controller 120, and carries out focus detection based on a well-known phase difference detection method.

On the other hand, the subject light reflected by the quick return mirror 102 located in the down position is emitted from an optical finder through a pentaprism 101 and an eyepiece 106.

In addition, for shooting, the quick return mirror 102 is rotated upward to move to an up position. Then, subject light entering through the photographing lens 201 and the aperture 202 passes through a focal plane shutter 108, which is a mechanical shutter, and through a filter 109, and forms a subject optical image on an image sensor 112 such as a CMOS image sensor or a CCD image sensor.

The filter 109 has two functions: One function is to cut infrared light while transmitting and guiding visible light to the image sensor 112, and the other is an optical low-pass filtering function.

The focal plane shutter 108 has a first curtain and a second curtain, and transmits or blocks incident light from the photographing lens 201 in accordance with control exercised by a shutter control circuit 111.

It is to be noted that when the quick return mirror 102 moves to the up position, the sub-mirror 103 is folded to move out of the light path.

The system controller 120 is composed of, for example, a CPU, and controls the general camera system including the digital camera 100 as well as external units (the lens unit 200, an external strobe 300, etc.) connected to the digital camera 100. Programs executed by the CPU constituting the system controller 120 are stored in, for example, an EEPROM 122.

The live view display control operation described below is also achieved by the system controller 120 controlling each unit of the digital camera 100.

The lens unit 200 is provided with a lens drive mechanism 203 for moving the photographing lens 201 along the optical axis in accordance with control exercised by a lens control circuit 204, and an aperture drive mechanism 205 for driving the aperture 202 in accordance with control exercised by an aperture control circuit 206.

The lens control circuit 204 and the aperture control circuit 206 are communicably connected through the contacts 210 to the system controller 120, and operate in accordance with control exercised by the system controller 120. The lens control circuit 204 is also provided with a lens storage device for storing information unique to the lens unit 200, for example, information such as a focal length, an open aperture, lens ID, and information received from the system controller 120.

A shutter charge and mirror drive mechanism 110 controls the up and down movement of the quick return mirror 102 and the shutter charge of the focal plane shutter 108 in accordance with control exercised by the system controller 120.

The shutter control circuit 111 controls the travel of the first curtain and second curtain of the focal plane shutter 108 in accordance with control exercised by the system controller 120.

A metering circuit 107 is provided near the eyepiece 106 to be connected to a photometric sensor, not shown, for measuring the subject brightness, and carries out metering in accordance with control exercised by the system controller 120. The output of the photometric sensor is supplied via the metering circuit 107 to the system controller 120.

The EEPROM 122 stores parameters which need to be adjusted for controlling the digital camera 100, camera ID information which can be used for individually identifying the digital camera 100, AF correction data adjusted with a reference lens, correction values for automated exposure control, and the like.

The system controller 120 forms a subject image on the image sensor 112 by controlling the drive mechanism 203 depending on the output of the focus detection circuit 105. Further, the system controller 120 controls the aperture drive mechanism 205 based on a predetermined aperture value (Av value), and controls the shutter control circuit 111 based on a predetermined shutter speed value (Tv value).

In the present embodiment, the first curtain and the second curtain of the focal plane shutter 108 have a drive source composed of a spring, which requires shutter charge for the subsequent operation after travel of the shutter. The shutter charge and mirror drive mechanism 110 controls this shutter charge. Further, the shutter charge and mirror drive mechanism 110 controls the up and down movement of the quick return mirror 102.

Furthermore, an image data controller 115 is connected to the system controller 120. The image data controller 115 is composed of, for example, a DSP (digital signal processor), and executes control of the image sensor 112 and correction or processing of image data input from the image sensor 112, based on control exercised by the system controller 120. The correction and processing of image data, carried out by the image data controller 115, include automatic white balance processing. The white balance processing refers to processing for correcting a portion of a shot image with the maximum brightness to a predetermined color (white color). The amount of correction in the automatic white balance processing can be changed by control from the system controller 120.

The system controller 120 can carry out metering with the use of the image data controller 115, apart from the metering circuit 107. Specifically, a shot image is divided into regions by the image data controller 115, and an integral value is obtained for pixel signals corresponding to a color filter of the same color among pixels constituting each region. Then, metering is carried out by evaluating the integral value with the system controller 120.

A timing pulse generating circuit 114 generates timing pulses required for driving the image sensor 112. The timing pulses are also supplied to an A/D converter 113.

In response to the timing pulses generated by the timing pulse generating circuit 114, the A/D converter 113 converts analog signals for each pixel constituting a subject image, output from the image sensor 112, to digital signals.

A DRAM 121 temporarily stores the image data (digital data) of the digital signals obtained through conversion by the A/D converter 113. The DRAM 121 is also used to temporarily store image data before carrying out processing or data conversion into a predetermined format.

An image compression circuit 119 subjects the image data stored in the DRAM 121 to compression coding in a predetermined format (for example, JPEG format), and decodes image data subjected to compression coding and recorded on a recording medium 401. The image data coded by the image compression circuit 119 is stored in the recording medium 401. The recording medium 401 may be, for example, a magnetic recording device such as a hard disk, a semiconductor storage device such as a memory card, or an optical recording device such as an optical disk.

An image display circuit 118 is connected via an encoder circuit 117 to a D/A converter 116. The image display circuit 118 is a circuit for displaying image data sensed by the image sensor 112 or image data stored in the recording medium 401, and generally includes a color display device such as an LCD.

The image data controller 115 instructs the D/A converter 116 to convert the image data stored in the DRAM 121 to analog signals and output the analog signals to the encoder circuit 117. The encoder circuit 117 converts the analog signals output from the D/A converter 116 to video signals (for example, NTSC signals) that can be displayed on the image display circuit 118.

A contrast detection circuit 140 subjects the image data corrected by the image data controller 115 to predetermined gamma processing. The gamma processing can be achieved by applying a filter with predetermined frequency characteristics to the image data. The contrast detection circuit 140 evaluates the contrast of the image data subjected to the gamma processing, and supplies the result of the evaluation to the system controller 120.

The system controller 120 communicates with the lens control circuit 204 and acquires the evaluation result from the contrast detection circuit 140 while varying the position of the photographing lens 201 to search for a lens position at which the contrast evaluation result is higher than a predetermined level. This is focus detection control by the so-called contrast method.

An operation display circuit 123 displays information on the operation mode of the digital camera 100, exposure information (shutter speed, aperture value, etc.), and the like on an external liquid crystal display device 124 or an internal liquid crystal display device 125.

A shooting mode selection button 130 is a button for the user to select a desired shooting mode from multiple shooting modes provided for the digital camera 100.

A main electronic dial 131 is used for the user to select a menu item or select an aperture value or a shutter speed. A determination SW 132 is used to determine a selected item or value, or for the user to request execution of an operation.

A focusing area selection button 133 is a button for selecting a focus detection area desired by the user from multiple focus detection areas given by the AF sensor unit 104.

A display mode selection SW 134 is a switch for selecting a live view display mode.

A metering mode selection SW 135 is used to select a metering mode desired by the user from multiple metering modes, such as a spot metering mode or a central focus metering mode.

A release SW1 (136) for initiating preparative shooting operation, such as metering and focusing, a release SW2 (137) for initiating shooting operation, and a viewfinder mode selection SW 138 are further connected to the system controller 120.

The external display device 124 is typically disposed on the back or top of the digital camera 100, and displays a variety of information such as exposure information and the number of shots that can be taken. Further, the internal display device 125 is disposed inside the digital camera 100, and used to display a variety of information in the optical viewfinder.

The viewfinder mode selection SW 138 is a switch for switching whether or not to carry out live view display so that the display device included in the image display circuit 118 functions as an electronic viewfinder (EVF). In this specification, the state in which the display device included in the image display circuit 118 is used as an EVF is referred to as a live view display mode.

During the live view display mode, the system controller 120 controls the exposure for shooting images to be used for live view display, in accordance with the metering result obtained by the metering circuit 107 or the metering result obtained by image data controller 115, and the display mode.

Further, the external strobe 300 can be mounted on the digital camera 100 according to the present embodiment, via a lens mount, not shown. The lens mount is provided with contacts 310 for communicating between the digital camera 100 and the external strobe 300. Furthermore, the lens mount also has the function of transmitting signals to the system controller 120 when the external strobe 300 is mounted.

Light emission of the external strobe 300 can be controlled from the digital camera 100 by communicating between the digital camera 100 and the external strobe 300 through the contacts 310 of the lens mount. It is to be noted that any form of signal may be used for communication performed through the contacts 310, and any form of signal such as not only electrical signals but also optical signals is available. Therefore, the contacts 310 can employ a configuration in accordance with the form of the signals used.

Figure 2:
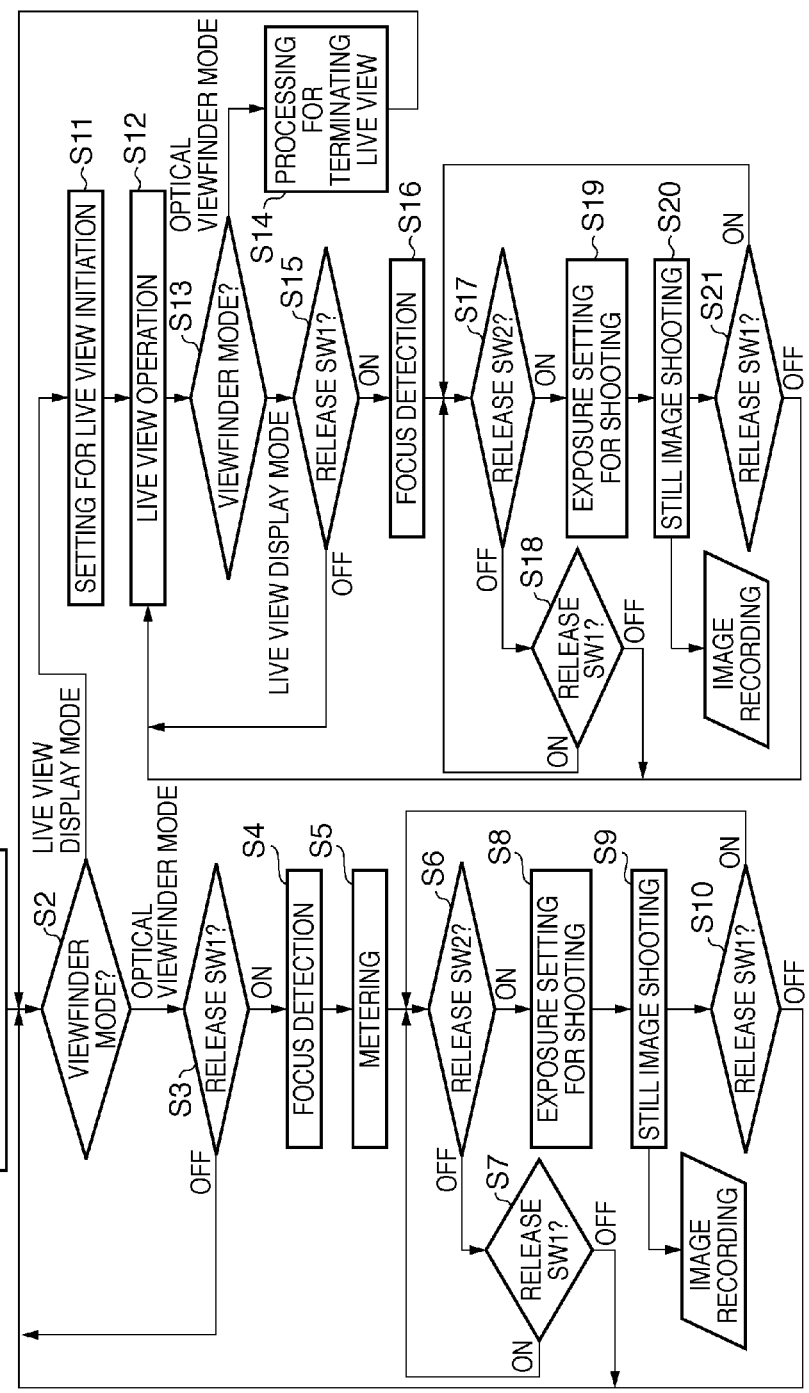
FIG. 2 is a flow chart showing the general operation of a digital camera 100 according to the embodiment of the present invention.

The general operation of the digital camera 100 according to the present embodiment, which has the configuration described above, will now be described in detail with reference to the flow chart shown in FIG. 2.

On power activation, the system controller 120 initializes flags, controls variables, and the like, and records control parameters and set values on the EEPROM 122 that is a non-volatile memory (S1).

The system controller 120 checks the state of the viewfinder mode selection SW 138 (S2). Then, the system controller 120 executes processing from S3 in a case in which an optical viewfinder mode is selected, or processing from S11 in a case in which a live view display mode is selected.

(Optical Viewfinder Mode)

First, the operation shown in S3 to S10 in the optical viewfinder mode will be described.

In S3, the system controller 120 checks the state of the release SW1 (136), and returns the processing to S2 if the release SW1 (136) is in an OFF state. Alternatively, if the release SW1 (136) is in an ON state, the system controller 120 moves the processing to S4.

In S4, the system controller 120 communicates with the lens control circuit 204 and instructs the lens drive mechanism 203 to drive the photographing lens 201 to a desired position to adjust focusing, in accordance with the outputs of the AF sensor unit 104 and focus detection circuit 105.

In S5, the system controller 120 performs metering calculation to calculate an exposure control value (Bv value) in accordance with the state of the metering mode selection SW 135 and the output of the metering circuit 107, and holds the calculated exposure control value, for example, on the DRAM 121. The exposure control value (Bv value) here refers to an index representing a brightness level, and is expressed in known APEX (Additive System of Photographic Exposure) units.

The exposure control value can be represented as follows using APEX units:

$$Bv=Tv+Av-Sv$$

where Tv, Av, and Sv represent a shutter speed (corresponding to accumulating time), an aperture value, and a gain level such as an ISO sensitivity, each of which is a value (APEX value) expressed in APEX units. Further, the conversion of actual set values to APEX values can be performed as follows:

$$Av=2\log_2(F\text{ number})$$

$$Tv=-\log_2(\text{exposure time (seconds)})$$

$$Sv=\log_2(\text{ISO sensitivity value}/3.125)$$

It is to be noted that integers are used for the Av value, Tv value, and Sv value in the present embodiment. Examples of the values as integers are described in JEIDA-49-1998, "Image File Format Specification for Digital Still Cameras (Exif) Version 2.1", "Appendix C: about APEX".

In S6, the system controller 120 checks the state of the release SW2 (137), and moves the processing to S7 if the release SW2 (137) is in an OFF state. Alternatively, if the release SW2 (137) is in an ON state, the system controller 120 moves the processing to S8 to initiate shooting operation.

In S7, the system controller 120 checks the state of the release SW1 (136), and moves the processing to S6 if the ON state is held. Alternatively, if the release SW1 (136) is in the OFF state, the system controller 120 discards the exposure control value (Bv value) stored in S5 and returns the processing to S2.

In S8, the system controller 120 determines the Tv value, Av value, and ISO value (Sv value) for shooting, in accordance with the exposure control value (Bv value) calculated in S5 and the state of the shooting mode. It is to be noted that, in the digital camera 100 according to the present embodiment, the shooting mode refers to a shooting parameter which can be selected by the shooting mode selection button 130, and includes an aperture-priority AE mode, a shutter speed-priority mode, an automatic setting mode, and a manual setting mode.

In S9, the system controller 120 carries out still image shooting. Specifically, the system controller 120 notifies the aperture control circuit 206 of the determined Av value. The aperture control circuit 206 transmits to the aperture drive mechanism 205 pulses corresponding to the amount of aperture drive in order to drive the aperture position to a desired aperture state (F number) based on the provided Av value. The aperture drive mechanism operates a stepping motor based on the transmitted pulse signal, adjusts the aperture to the desired aperture position, and maintains a state of conduction of a coil to hold the aperture state.

Then, the system controller 120 moves the quick return mirror 102 up via the shutter charge and mirror drive mechanism 110. Further, the system controller 120 instructs, via the shutter control circuit 111, the first curtain and second curtain to travel at a shutter speed corresponding to the Tv value determined in S8, and exposes the image sensor 112.

Then, image signals read out from the image sensor 112 and digitalized by the A/D converter 113 are subjected to image correction carried out by the image data controller 115. Further, the image signals are subjected to compression coding into JPEG format or the like by the image compression circuit 119, followed by the addition of predetermined additional information, and recorded as an image file on the recording medium 401.

In S10, the system controller 120 checks the state of the release SW1 (136), and returns the processing to S6 if the ON state is held. Alternatively, if the release SW1 (136) is in the OFF state, the system controller 120 discards the stored exposure control value (Bv value), drives the aperture to the open position to end the state of conduction of the coil of the aperture drive mechanism, and returns the processing to S2.

(Live View Display Mode)

Next, operation (S11 to S22) in a case in which a live view display mode set by the viewfinder mode selection SW 138 will be described.

In S11, the system controller 120 moves the quick return mirror 102 up via the shutter charge and mirror drive mechanism 110. Further, the system controller 120 opens the focal plane shutter 108 via the shutter control circuit 111, thereby resulting in the image sensor 112 being continuously exposed by subject light entering through the lens unit 200.

In a live view operation of S12, the system controller 120 instructs the A/D converter 113 to convert image signals sequentially read out from the image sensor 112 at every predetermined accumulating time (corresponding to the shutter speed of the electronic shutter) to digital signals. After that, the digital signals are subjected to image processing carried out by the image data controller 115, reconverted to analog image signals by the D/A converter 116, encoded by the encoder circuit 117, and transferred to a VRAM (not shown) of the image display circuit 118. This procedure is executed, for example, every ⅟₃₀ seconds per screen (frame), and images are sequentially displayed on a display device placed on the back side or the like of the digital camera 100.

Further, the system controller 120 carries out the metering (described above) with the use of the image data controller 115 and periodically obtains a metering brightness value (metering Bv value) for the frame corresponding to a predetermined metering period among the frames read out from the image sensor 112.

In accordance with a value of ΔBv that is a difference between the obtained metering brightness value and the exposure control value (control Bv value) for defining actually used exposure conditions, and the set live view display mode, the system controller 120 updates the control Bv value. Then, the system controller 120 determines exposure conditions (the aperture, the accumulating time (the speed of the electronic shutter), and the ISO sensitivity) for the next frame based on the control Bv value updated if necessary.

The control Bv value also has the same value (brightness value) as that of the metering Bv value, and can be represented as follows:

$$\text{control } Bv = Tv + Av - Sv$$

Thus, the system controller 120 can determine a combination of Tv, Av, and Sv from which the control Bv value is obtained, with the use of a program diagram or the like stored in advance, and determine exposure conditions for the next frame.

Figure 3:
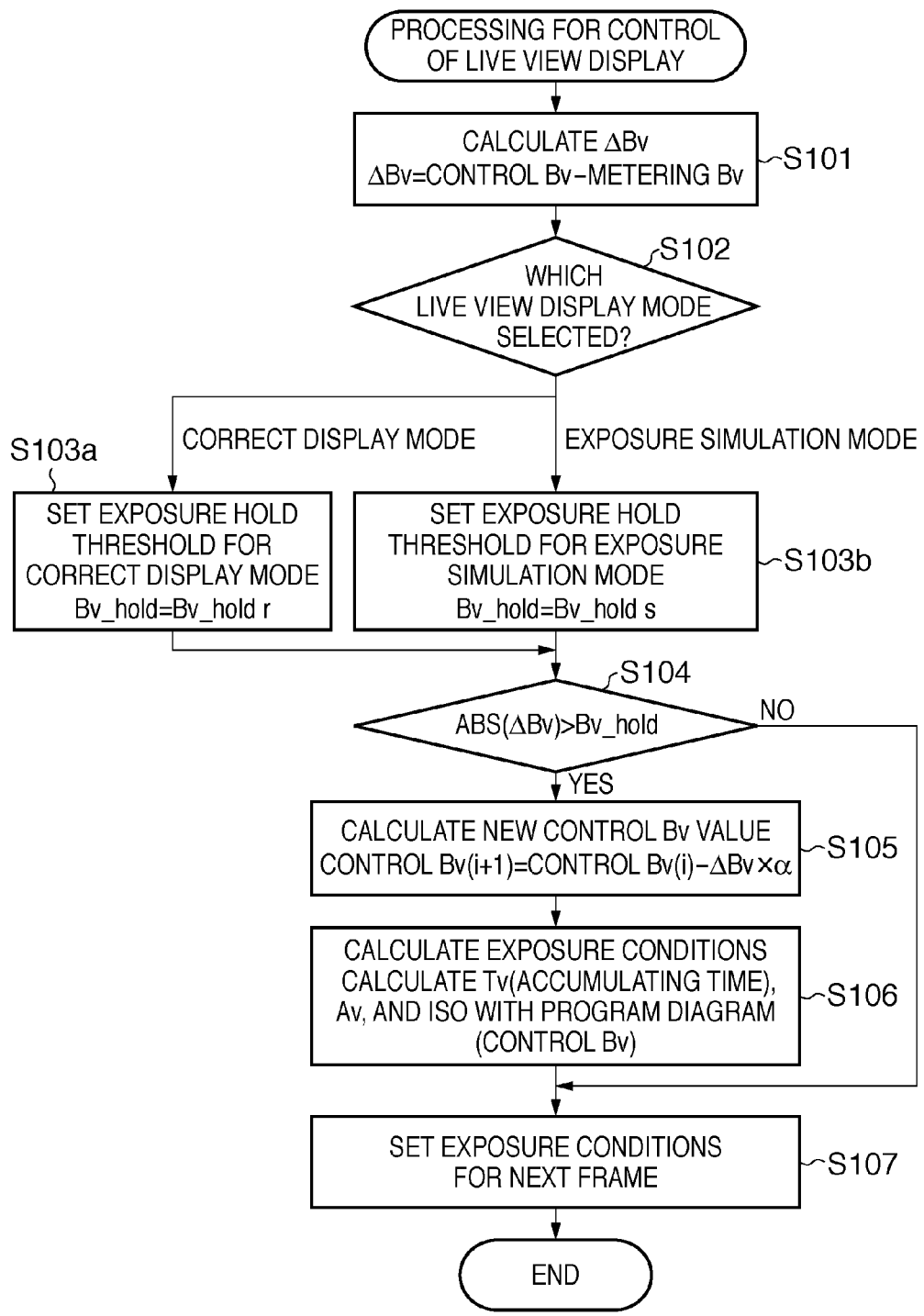
FIG. 3 is a flow chart for explaining live view display control processing in the digital camera 100 according to the embodiment of the present invention.

The live view display in the digital camera 100 according to the present embodiment will be described in detail with reference to FIGS. 3 and 4.

In S101 of FIG. 3, the system controller 120 as a unit of acquisition obtains the difference value (ΔBv) between the metering value (metering Bv) obtained by the image data controller 115 and the exposure control value (control Bv) that refers to the brightness (exposure conditions) of a live View image as follows:

$$\Delta Bv = \text{control } Bv - \text{metering } Bv \qquad (1)$$

As described above, ΔBv represents the difference between the subject brightness and the image brightness obtained from the exposure condition of the live view image.

In S102, the system controller 120 checks the display mode selected by the display mode selection SW 134. It is assumed that either a mode (correct display mode) for live view display of an image exposed under exposure conditions for correct exposure or a mode (exposure simulation mode) for display of an image giving an indication of an image obtained in the case of shooting under exposure conditions currently set can be selected in the present embodiment.

The system controller 120 moves the processing to S103a in a case in which the correct display mode is set, or to S103b in a case in which the exposure simulation mode is set.

In S103a to S103b, the system controller 120 refers to a correspondence table, for example, stored in the EEPROM 122 to acquire an exposure hold value in accordance with the display mode, sets the acquired exposure hold value as a variable Bv_hold, and moves the processing to S104. FIG. 4 shows an example of the correspondence table for the exposure hold value and the exposure control mode. The example in FIG. 4 shows values for the exposure hold value with the value of 8 for one step (corresponding to the APEX value of 1).

The exposure hold value refers to a threshold for determining if the exposure condition should be changed, and the exposure value is changed in a case in which ΔBv exceeds the exposure hold value. For example, in the case of using the correct display mode as the display mode, the exposure condition will be changed in a case in which ΔBv exceeds 4 (for 0.5 steps). Conversely, the exposure condition will not be changed if ΔBv is 4 or less (i.e., the threshold or less).

In S104, the system controller 120 compares the absolute value ABS (ΔBv) of ΔBv obtained in S101 with the value of Bv_hold set in S103. Then, in a case in which the ABS (ΔBv) is greater than the value of Bv_hold, the processing is moved to S105, and in a case in which the ABS (ΔBv) is the value of Bv_hold or less, the processing is moved to S107.

In S105, the system controller 120 calculates control Bv(i+1) as the exposure conditions for the next frame (i+1) in accordance with the following formula:

$$\text{control } Bv(i+1) = \text{control } Bv(i) - \Delta Bv \times \alpha \qquad (2)$$

where control Bv(i) represents control Bv used until now, and α represents a correction coefficient for controlling the amount of change in exposure.

In S106, the system controller 120 determines exposure conditions (Tv value, Av value and Sv value) corresponding to the control Bv(i+1) with the use of the control Bv(i+1) obtained in S105 and, for example, a program diagram stored in the EEPROM 122. Further, the system controller 120 obtains the accumulating time (shutter speed) corresponding to the determined Tv value and the ISO sensitivity (shooting sensitivity) corresponding to the Sv value.

In S107, the system controller 120 sets exposure conditions for the next frame in the image data controller 115 (the accumulating time and the shooting sensitivity) and the aperture control circuit 206 (the Av value), with the use of the exposure conditions obtained in S106.

Now, the change in the brightness of field in each display control mode, that is, the change in brightness (corresponding to the metering Bv) in continuous image frames, and the change in control Bv value for the corresponding display exposure control will be described with reference to FIGS. 5A and 5B.

In FIGS. 5A and 5B, the horizontal axis indicates frames to be subjected to metering in chronologic order. The vertical axis indicates a Bv value, and shows a range of one step relatively above and below a predetermined value as a reference. As described with reference to FIG. 4, it is assumed here in the present embodiment that the Bv value corresponding to one step is 8. This corresponds to the resolution of the Bv value being ⅛ step.

FIG. 5A shows an example of exposure control in a correct display mode as the display mode.

It is assumed that each of the metering Bv value and control Bv value in frame (t)=1 is a reference value (0), and then, the metering Bv value is +6 in the next metering frame (t)=2. At this point, the control Bv value remains 0. Therefore, ΔBv at this point is −6 from formula (1).

In addition, since the exposure hold value in the correct display mode is 4 as shown in FIG. 4, the ABS (ΔBv) is larger than the Bv_hold (=4).

Thus, if in formula (2) α=0.7 and the fractional part is discarded, the value of control Bv(i+1) for the next frame will be control Bv(i)+4. The control Bv values obtained for each frame in a similar manner are represented by the dotted line. Based on this control Bv value, the exposure conditions for each frame are determined.

As is clear from FIGS. 5A and 5B, providing each display mode with an individual exposure hold value allows exposure control for the live view display to be switched, thereby allowing display exposure control suitable for each display mode to be exercised.

Specifically, in the exposure simulation mode, emphasis is placed on the sensitivity to the change in subject brightness to set a small exposure hold value, so as to enable the user to grasp the images that would be obtained in actual shooting.

On the other hand, in the correct display mode, emphasis is placed on the visibility of live view images to set a large exposure hold value such that the change in brightness (e.g., the change in control Bv value) for live view images is gradual with respect to variations in the subject brightness.

It is to be noted that the resolution (⅛ step) of the exposure hold value and the values therefor, shown in FIG. 4, are by way of example only, and of course, other values can be set. For example, in the correct display mode, larger values (for example, the value corresponding to one step (that is, 8)) can be set.

In S13, the system controller 120 checks the state of the viewfinder mode selection SW 138, and moves the processing to S14 in a case in which the optical viewfinder mode is selected or to S15 in a case in which the live view display mode is selected.

In S14, the system controller 120 executes processing for terminating the live view display. Specifically, the system controller 120 stops, via the image data controller 115, reading of signals from the image sensor 112. Further, the system controller 120 closes the focal plane shutter 108 via the shutter charge and mirror drive mechanism 110, and moves the quick return mirror 102 to the down position. When the processing for terminating the live view display is completed, the system controller 120 returns the processing to S2.

In S15, the system controller 120 checks the state of the release SW1 (136), and either returns the processing to S12 if the release SW1 (136) is in the OFF state or moves the processing to S16 if the release SW1 (136) is in the ON state.

The processing in S16 to S21 is similar to S5 to S10, and description thereof will be omitted.

As described above, according to the image capturing apparatus of the present embodiment, the exposure hold value, which is a parameter for controlling sensitivity to changes in brightness (e.g., the change in exposure conditions) for live view images with respect to variations in subject brightness, is switched in, accordance with the live view display mode, thereby allowing suitable live view display in accordance with the live view display mode to be carried out.

Further, in the present embodiment, as a method for switching the width of a dead band for response to changes in subject brightness, the threshold of the exposure hold is switched to switch the live view display control. Alternatively, however, the time constant for changing the sensitivity of the exposure or the parameter for determining the tracking capability of the exposure may be switched to switch the live view display control.

Further, in the present embodiment, the exposure control of the live view display for still image shooting is switched in accordance with each display mode. However, in the case of an image capturing apparatus that is capable of shooting moving images, the exposure control of the live view display may be switched between a still image shooting mode and a moving image shooting image.

Specifically, in the still image shooting mode, emphasis is placed on the sensitivity to the change in the subject brightness to set a small exposure hold value so as to enable the user to grasp the images that would be obtained during still image shooting. On the other hand, in the moving image shooting mode, emphasis is placed on the visibility of shot images to set a large exposure hold value such that the change in brightness for live view images is gradual with respect to variations in the subject brightness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a National Stage filing of PCT application No. PCT/JP2008/069281 filed on Oct. 17, 2008 which claims priority from Japanese Patent Application No. 2007-283793, filed on Oct. 31, 2007, all of which are hereby incorporated by reference herein in their entirety.

The invention claimed is:

1. An image capturing apparatus that is capable of live view display in which, while continuously exposing an image sensor, image signals are sequentially read out, and live view images generated based on the read image signals are sequentially displayed on a display device, and capable of selecting a display mode for the live view display from multiple display modes, the image capturing apparatus comprising:
   a metering unit for periodically measuring a subject brightness during the live view display;
   an acquisition unit for obtaining a difference between an image brightness obtained from exposure conditions for acquiring the live view images and the measured subject brightness; and
   a changing unit for changing the exposure conditions for acquiring the live view images depending on a threshold corresponding to the selected display mode and the value of the difference.

2. The image capturing apparatus according to claim 1, wherein the changed exposure conditions comprise at least one of an aperture value, a shooting sensitivity, and an accumulating time for the image signals.

3. The image capturing apparatus according to claim 1, wherein the threshold corresponding to the selected display mode is a value for controlling a sensitivity of the image brightness to variations in the measured subject brightness.

4. The image capturing apparatus according to claim 1, wherein the changing unit does not change the exposure conditions for acquiring the live view images in a case in which the value of the difference is at or below the threshold corresponding to the selected display mode.

5. A control method for an image capturing apparatus that is capable of live view display in which, while continuously exposing an image sensor, image signals are sequentially read out, and live view images generated based on the read image signals are sequentially displayed on a display device, and capable of selecting a display mode for the live view display from multiple display modes, the control method comprising:
   periodically measuring a subject brightness during the live view display;
   obtaining a difference between an image brightness obtained from exposure conditions for acquiring the live view images and the measured subject brightness; and
   changing the exposure conditions for acquiring the live view images depending on a threshold corresponding to the selected display mode and the value of the difference.

6. An image capturing apparatus that is capable of, while continuously exposing an image sensor, sequentially reading out image signals and sequentially displaying display images generated based on the read image signals on a display device, and capable of selecting a shooting mode from multiple shooting modes, the image capturing apparatus comprising:
   a metering unit for measuring a subject brightness when displaying the display images on the display device;

an acquiring unit for obtaining a difference between an image brightness obtained from exposure conditions for acquiring the display images and the measured subject brightness; and a changing unit for changing the exposure conditions for acquiring the display images, depending on the width of a dead band corresponding to the selected shooting mode and on the value of the difference.

7. The image capturing apparatus according to claim 6, wherein the multiple shooting modes comprise a still image shooting mode and a moving image shooting mode.

8. The image capturing apparatus according to claim 6, wherein the changed exposure condition comprises at least one of an aperture value, a shooting sensitivity, and a accumulating time for the image signals.

9. A control method for an image capturing apparatus that is capable of, while continuously exposing an image sensor, sequentially reading out image signals and sequentially displaying display images generated based on the read image signals on a display device, and capable of selecting a shooting mode from multiple shooting modes, the control method comprising:

measuring a subject brightness during display of the display images on the display device;

obtaining a difference between an image brightness obtained from exposure conditions for acquiring the display images and the measured subject brightness obtained in the measuring step; and changing the exposure condition for acquiring the display images depending on the width of a dead band corresponding to the selected shooting mode and the value of the difference.

* * * * *